(12) United States Patent
Chabala

(10) Patent No.: US 9,212,475 B2
(45) Date of Patent: Dec. 15, 2015

(54) SELF DISINFECTING DRAIN TRAP

(76) Inventor: Mwelwa Chabby Chabala, London (GB)

(*) Notice: Subject to any disclaimer, the term of this patent is extended or adjusted under 35 U.S.C. 154(b) by 819 days.

(21) Appl. No.: 13/505,132

(22) PCT Filed: Oct. 29, 2010

(86) PCT No.: PCT/GB2010/002013
§ 371 (c)(1),
(2), (4) Date: Jul. 12, 2012

(87) PCT Pub. No.: WO2011/051685
PCT Pub. Date: May 5, 2011

(65) Prior Publication Data
US 2012/0266378 A1    Oct. 25, 2012

(30) Foreign Application Priority Data

Oct. 29, 2009 (GB) .................................. 0918977.0

(51) Int. Cl.
*A47K 1/14* (2006.01)
*E03C 1/126* (2006.01)
*C02F 1/68* (2006.01)

(52) U.S. Cl.
CPC ................. *E03C 1/126* (2013.01); *C02F 1/687* (2013.01); *Y10T 137/0441* (2015.04)

(58) Field of Classification Search
CPC ........... C02F 1/687; C02F 1/688; E03C 1/126

USPC ........... 4/652, 679, 226.1, 292–294, DIG. 14; 137/240, 247.51, 268

See application file for complete search history.

(56) References Cited

U.S. PATENT DOCUMENTS

| 1,217,763 | A | * | 2/1917 | Hirrich | ...................... 4/DIG. 14 |
| 1,763,562 | A | * | 6/1930 | Mulder | ......................... 137/240 |
| 6,915,814 | B2 | * | 7/2005 | Cheng | ...................... 137/247.51 |

FOREIGN PATENT DOCUMENTS

| DE | 0180451 A2 * | 5/1986 |
| EP | 9300660 U1 * | 3/1993 |

\* cited by examiner

*Primary Examiner* — Tuan N Nguyen
(74) *Attorney, Agent, or Firm* — William H. Bollman

(57) ABSTRACT

A drain trap U-bend which includes a molded housing for a re-usable disinfecting tablet dispenser (FIG. 1). The disinfecting tablet dispenser contains a disinfecting tablet (FIG. 4), which is released into the U-bend molding (FIG. 6: showing the tablet inside the housing molding) by a spring loaded tension device (FIG. 9: Showing the whole device including u bend, housing, rubber spur, and indicator). The tablet is stabilized within the housing of the dispenser by twin toothed rubber seals. (FIG. 10: Showing the sealant mechanism and that the water level is at the bottom sealer and with additional sealer higher up insuring no infections). The tablet is held in place by an upper ribbed rubber spur (FIG. 5). The dispenser is made water-tight by rubber O-ring that deforms to seal the branch between the dispenser and the molded housing of the U-bend.

15 Claims, 6 Drawing Sheets

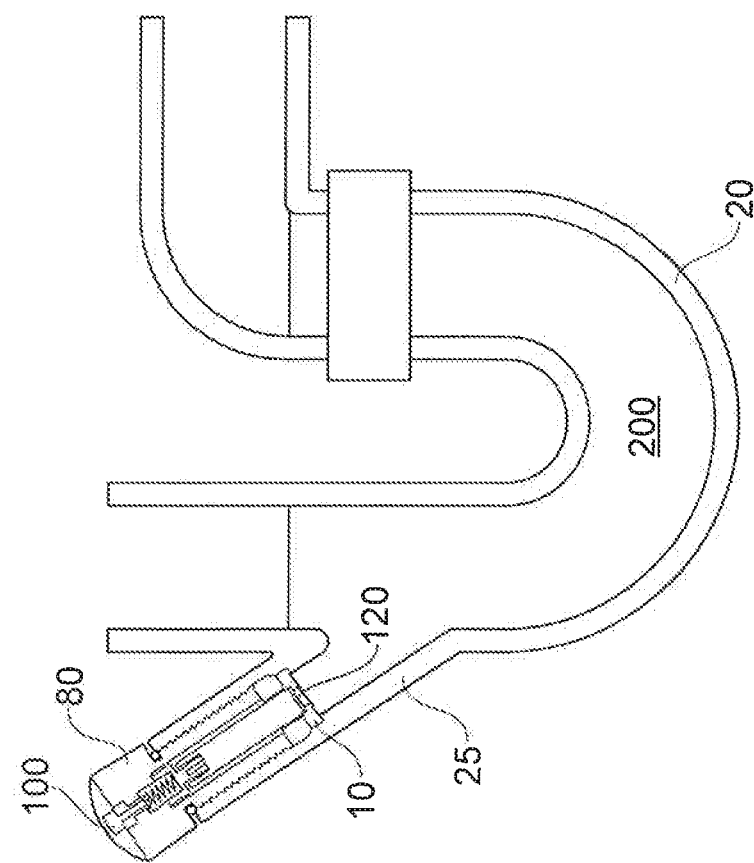
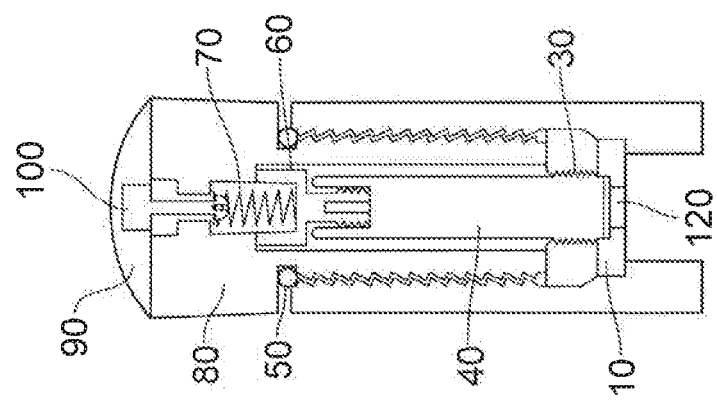
FIG. 1
FIG. 2

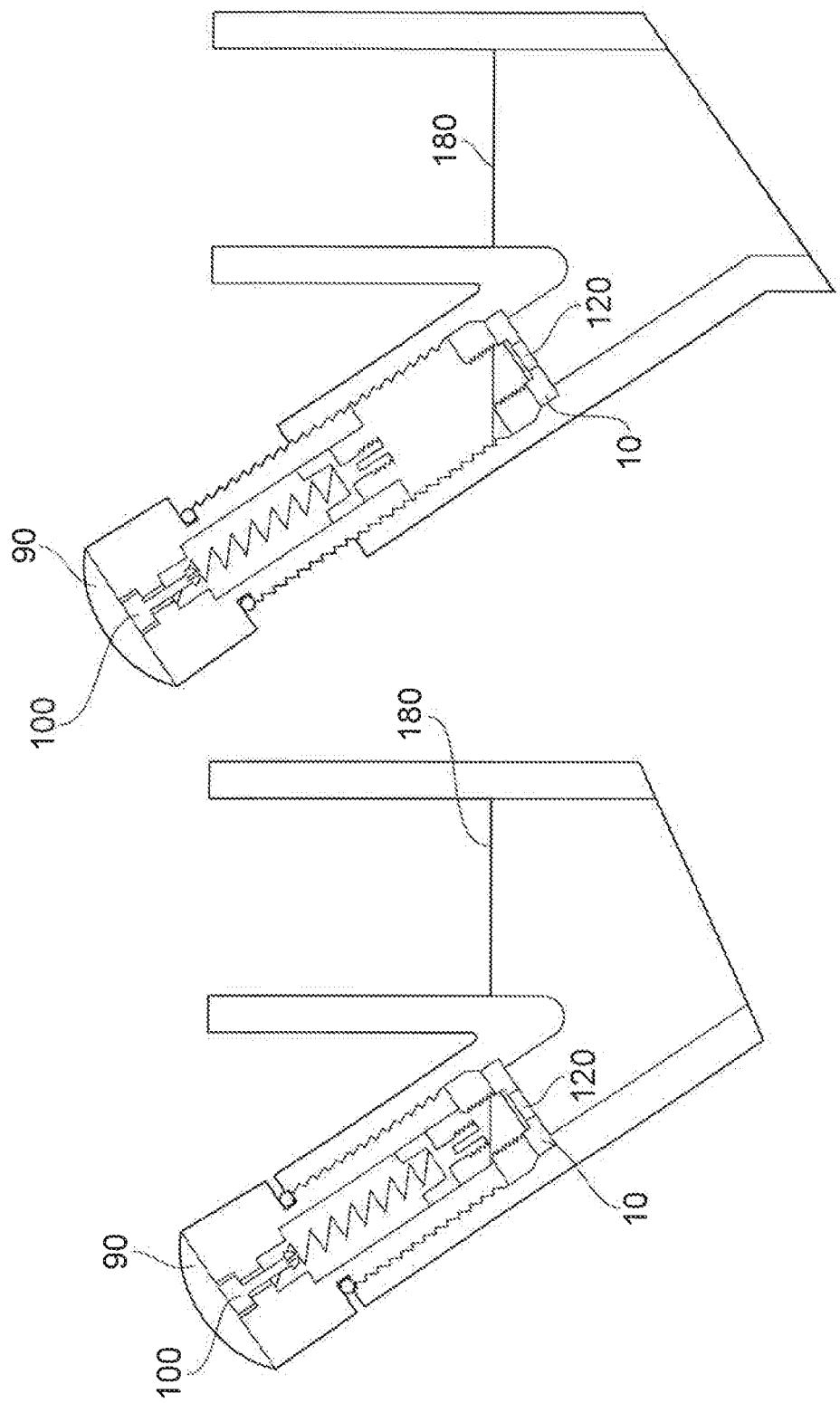

SELF DISINFECTING DRAIN TRAP

BACKGROUND

This invention relates to self disinfecting drain traps, more particularly it relates to self disinfecting drain traps for improving the standard of hygiene in sinks, baths, lavatories (WCs), showers and like appliances or devices with drains or water traps fitted with U-bends.

U-bends ensure that a barrier of water helps seal drains of sinks, baths, lavatories (WCs), showers and like appliances from main drains and sewers, so reducing odours.

PRIOR ART

As waste water that has been used by consumers and industrial users passes through drains and flushes through a U-bend of a sink, and into a drain, it is normal for deposits and sediments in the water to gather in certain sections. Over a period of time the build up of deposits results in build up of bacteria and odours emanating from the drains.

The most notorious section of the drain is the 'drain trap U bend' section. The shape of the drain trap U bend is responsible for the rapid build up of bacterial deposits.

Whilst there are various disinfectants in the marketplace, such as bleach that can be poured down the sink to temporarily kill bacteria, because of the shape of the drain, stagnant water still remains in the drain U-bend where sediments and deposits quickly build up. This results in rapid return of bacteria and odours. In places where there are many such sinks and drains, such as large offices, schools, hospitals and the like, the chance of bacteria spreading from sink, via a drain, to another sink presents a real hazard to health as many diseases are water borne.

Disinfectants poured down a sink, so as to clean a U-bend, tend to get washed away or diluted in a short time and so as they do not dwell in the U-bend for very long, their effectiveness is reduced. The washing away as water is drained out of a sink results at best therefore results in a weaker concentration of disinfectant.

U.S. Pat. No. 644,142 describes a means for retaining a disinfectant capsule in a generally hemispherical reservoir container that is located at a lower region of a drain trap U-bend. The hemispherical container is connected to the U-bend by a threaded coupling.

There are several drawbacks associated with this arrangement. One is that the seal between the hemispherical container and the drain trap is below the water line in the U-bend. Thus the seal is prone to leaks. Also, because the hemispherical container has to be removed periodically to replace the disinfectant, the connecting seal can become worn or contaminated.

A further inconvenience of the hemispherical container being located at the bottom of the U-bend trap arises when it must be removed to replace the disinfectant. When this occurs the water that is retained in the U-bend leaks from the U-bend, when replacement of the disinfectant block is carried out. A bucket or bowl is therefore needed to catch the water. There is also bacteria and debris that tends to be present in such water and this presents in itself a health hazard to the person replacing the disinfectant block. Furthermore when the water barrier is removed the user is subjected to unpleasant smells, as the barrier between the user and the drain/sewer is removed. As a result of these drawbacks people may be discouraged from replacing the disinfectant block.

US Patent Application US-A-2004/040597A1 describes a transparent pipe loop with a removable trap basin. In addition it has a drain valve in the basin for draining water from the loop. It also has a screen in a flow path for screening out debris. This device suffers from the same drawbacks as does the device of U.S. Pat. No. 644,142, namely that when replacing the disinfectant block, the water barrier is removed so increasing the risk of transmitting bacteria.

In particular, the seal between the removable trap and the pipe loop is below the normal water level of the U-bend, making it prone to leaks. Thus again when the removable trap basin is removed, a container is required to recover water from the U-bend. Debris and any potential blockages are viewable through the transparent pipe loop In order to see the spherical disinfectant, and to see the when it needs to be replaced, the hemispherical bowl may be made of a clear material. Food or other detritus from the basin, which settles at the bottom a drain trap U-bend, is usually unsightly. In order to see that the spherical disinfectant has been consumed it is also necessary to look at the unsightly mixture resting at the bottom of the U-bend. Such a clear hemispherical bowl at the bottom of a U-bend would not normally be chosen as a plumbing fixture where aesthetics were an important consideration such as in prestigious buildings, homes or hotel rooms.

One object of the present invention arose in order to overcome the drawbacks of the aforementioned prior art.

Another object of the present invention is to provide a drain trap for retaining a disinfecting tablet and enables quick and simple replacement of the disinfectant tablet.

SUMMARY OF THE INVENTION

According to a first aspect of the invention there is provided a self-disinfecting drain trap comprising: a drain trap U-bend moulding with a branch for receiving a solid disinfectant, the branch has a closure cap, whereby in use a portion of the solid disinfectant is maintained in contact with the liquid and the closure cap is located above the surface of the liquid.

It is appreciated therefore that use of the invention enables a solid disinfectant tablet, which may be a powder, gel, compressed granules, or liquid contained in a tablet, to be placed in the opening of the branch, by removing the closure cap, without liquid leaking from the trap, because the level of liquid is such that the water barrier is maintained throughout replacement of the disinfectant.

As the liquid does not need to be captured in a bucket or mopped from the floor and the odours in the pipes remain blocked by the liquid in the U-bend, the invention permits quick, simple and safe replacement of the solid disinfectant.

The disinfectant is ideally in a tablet form and contains bleach and/or disinfectant and/or perfumes for freshening air as well as optionally agents to breakdown and help disperse fats, greases and other chemicals.

Ideally a resiliently deformable member is located in the branch and in use urges the tablet to be in contact with the liquid. Thus as the tablet dissolves or consumed by the liquid it remains in contact with the liquid. Advantageously the entire tablet is usefully consumed.

In one embodiment the resiliently deformable member includes a spring. It is appreciated that other deformable members, such as elastomers, may be used to urge the tablet into the branch and maintain at least a portion of the tablet in contact with the water in the U-bend.

The resiliently deformable member may be arranged to locate the tablet between an upper indicator and a lower retention means. With this arrangement the force of the spring reacts advantageously between the indicator and the retentions means.

As the resiliently deformable member urges the tablet into contact with the liquid, in such a way so that it dissolves slowly over time releasing the required amount of disinfectant into the liquid. The liquid in the U-bend is thereby disinfected. The tablet slowly advances until it is fully consumed.

In one particularly preferred embodiment, the invention comprises a tablet holder which is use is sealed in the branch of the drain trap U-bend with an O-ring seal and provides disinfectant to the water in the trap. Ideally the tablet holder is removable from the U-bend moulding.

The tablet holder quickens and eases tablet replacement by allowing the user to insert the tablet and seal the branch in one step. The housing/reusable tablet holder ideally has a threaded outer sleeve adapted to engage with a thread disposed on an inner surface of the branch. A rubber seal is provided between a cap of the reusable tablet holder and the branch.

Preferably a self-disinfecting drain trap retains the tablet within a reusable tablet holder that is dimensioned and arranged to fit in the branch in a sealable manner. An advantage of this is that it allows the tablet to dissolve over time in a controllable manner.

To alert a user to when a tablet has been consumed and needs replacing, there is a preferably an indicator which provides the user with an alert. The indicator may include a spring loaded plunger adapted to trigger when predetermined amount of the tablet has dissolved, or the indicator may comprise a small battery or long-life cell and a switch which closes a circuit and triggers an alarm. Advantageously the alarm may be relayed to a remote user via a wireless communication system, such as a Bluetooth (Trade Mark) or Wi-Fi network.

There may be a maintenance system for use with a plurality of self-disinfecting drain traps adapted to receive broadcast alarms via the wireless communication network, so as to alert a supervisor of a maintenance system when a particular tablet dispenser needs refilling.

Preferably the alarm includes a unique identifier code that identifies the specific device and self disinfecting drain tap whose tablet need replacing.

Preferably there is also provided an electronic locator panel that identifies from where any alarms emanate, which shows the location of the self disinfecting drain tap which needs a replacement tablet and sends a short message service (SMS) text to a supervisor or maintenance engineer, so as to alert the location of the U-bend tablet needs replacing.

Instead of periodically checking all self disinfecting drain traps to see which one(s) need a replacement tablet, only the self disinfecting drain traps which transmit an alarm need to have their tablet replaced. This maintenance system saves time and labour in a plumbing system which has many self disinfecting drain traps.

The self disinfecting drain trap optionally comprises a valve located between the branch and the U-bend and which in use is opened by the insertion of the reusable tablet holder. Such a valve is arranged to close upon removal of the reusable tablet holder and isolates the branch from the U-bend. The purpose of this valve is to prevent overflow from the branch if liquid should be poured into the sink above the self disinfecting drain trap while the branch closure cap is removed. The valve also allows the self disinfecting drain trap to operate as conventional U-bend drain trap without the closure cap or tablet in place and in the event of inadvertently leaving the branch open or in the occasion of failing to replace a reusable tablet holder in the branch.

According to another aspect of the invention there is provided a method of replacing a disinfectant tablet in a self-disinfecting drain trap comprising the steps of: removing a branch closure cap, inserting a tablet so that the tablet is placed in contact with the liquid, whilst preserving the liquid barrier in a U-bend; and replacing the closure cap. With this method there is no need for a bucket or wet mop, there is no bad odour lost from the plumbing pipes, and the U-bend traps are treated efficiently with disinfectant.

The self disinfecting drain trap is an improvement over the standard drain trap U bend which can be found in most consumer and some industrial drains.

According to a further aspect of the invention there is provided a tablet, for use with a self-disinfecting drain trap having a branch, the tablet being formed from a material that dissolves and releases a disinfectant when the tablet is maintained in contact liquid in the drain trap.

Ideally the tablet is received in a reusable tablet holder, the tablet being formed from a material that dissolves and releases a disinfectant when the tablet is maintained in contact liquid in the drain trap.

Ideally the tablet is dimensioned and arranged to be received in the reusable tablet holder. The tablets may be spherical, cone shaped, cuboid or manufactured in any other shape so as to fit inside the reusable tablet holder. Likewise the tablet may be shaped so as to enhance controllable dissolution, for example by having a hollow bore so that water comes into contact with its interior and dissolves the tablet from its inside surface outwards.

The consumable tablet ideally is manufactured to last for weeks or ideally months before being fully consumed.

The hardware device has a visible indicator located within a sealed transparent silicon dome so that the user can observe when it needs refilling with a new tablet.

BRIEF DESCRIPTION OF THE DRAWINGS

The invention will now be described solely by way of example and with reference to the accompanying drawings in:

FIG. 1 shows a general assembly of the reusable tablet holder and consumable tablet in U-bend moulding;

FIG. 2 illustrates parts of a disinfecting tablet holder;

FIG. 10 is a view showing the reusable tablet holder with the tablet fully consumed;

FIG. 11 shows a view of partial removal of the tablet holder (without the tablet) from the U-bend trap;

DETAILED DESCRIPTION OF PREFERRED EMBODIMENTS OF THE INVENTION

Figure 5:
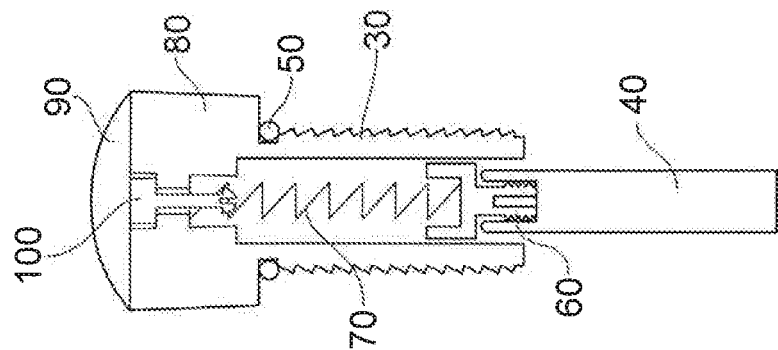
FIG. 5 shows an initial insertion view of the consumable tablet in the reusable tablet holder.
Figure 4:
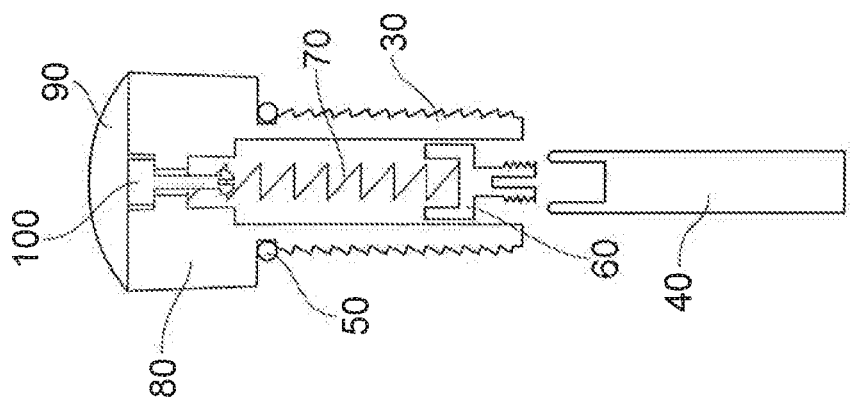
FIG. 4 shows a diagrammatical view of a pre-insertion view of the tablet and reusable tablet holder.
Figure 3:
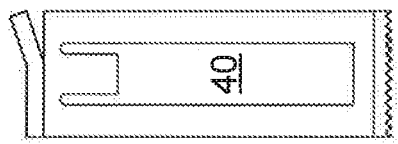
FIG. 3 shows a diagrammatical view of a wrapper enclosing a tablet.
Figure 8:
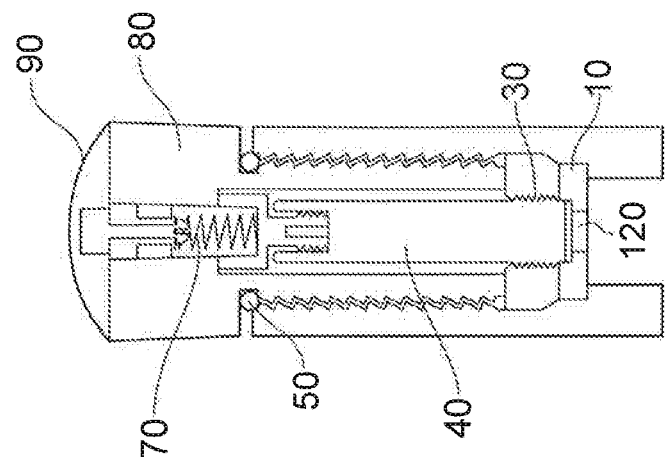
FIGS. 6 to 8 show progressively insertion of the tablet holder into the branch of the U-bend moulding, the reusable tablet holder holding a tablet.
Figure 7:
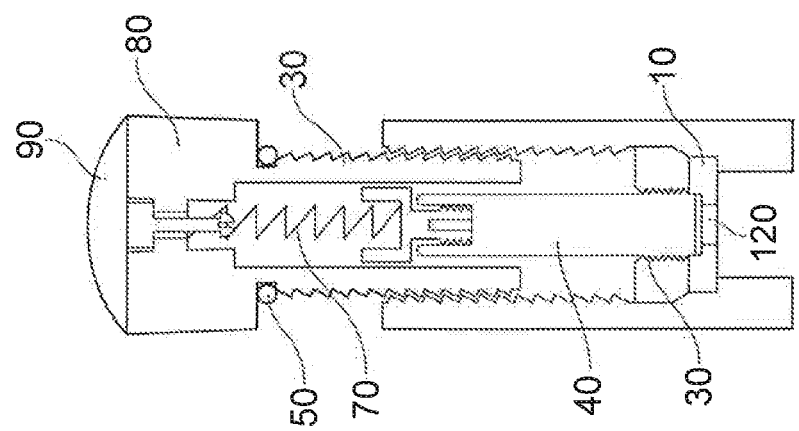
Figure 6:
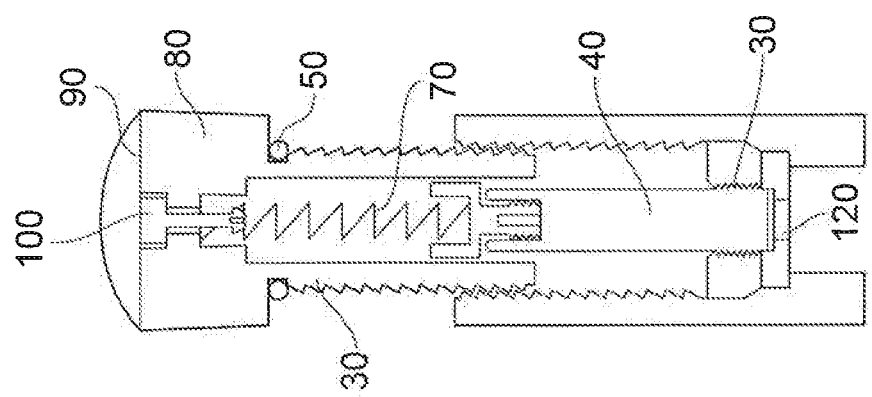
Figure 9:
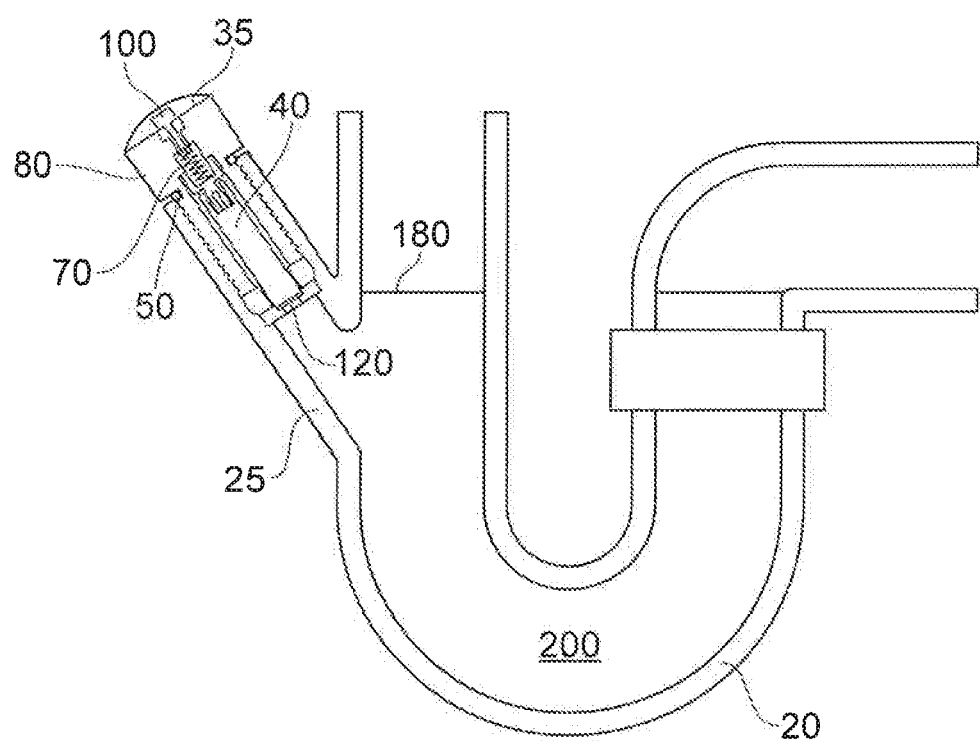
FIG. 9 is an overall view showing the reusable tablet holder inserted in a branch in the U-bend moulding.
Figure 12:
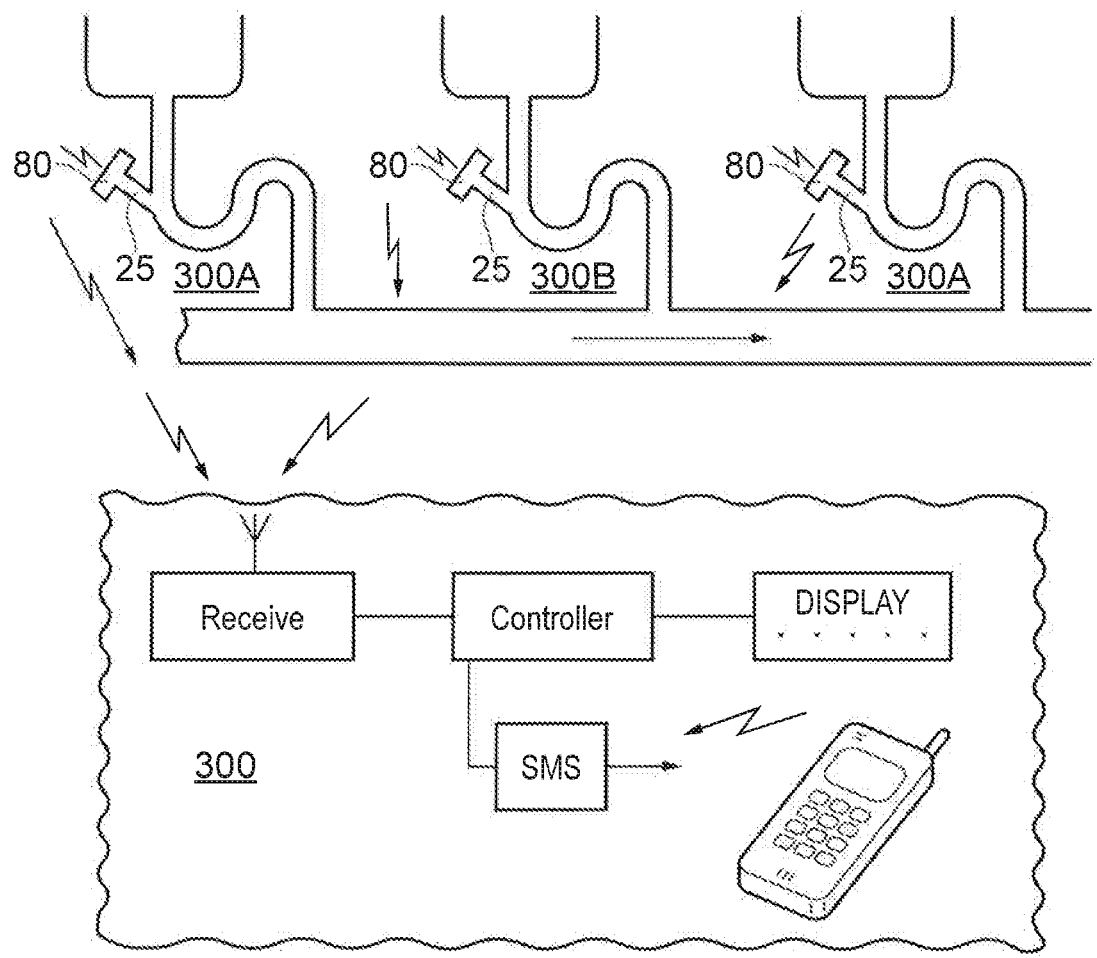
FIG. 12 is a diagrammatical view of a system comprising: a plurality of self disinfecting drain traps and a central maintenance system.
Figure 13:
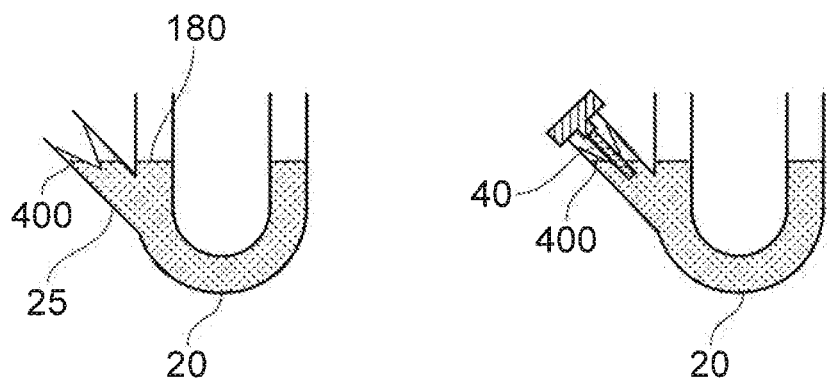
FIG. 13 shows an alternative embodiment of the U-bend trap with a self-closing valve.

Referring to FIGS. 1 to 10, in which like parts bear the same reference numerals, there is shown a general assembly of a consumable tablet 40 in a reusable tablet holder 80 to be received in a branch 25 of a U-bend drain or moulding 20. In use a portion of the consumable tablet is in contact with the water in U-bend moulding 20. A closure cap 35 covers the opening of the branch 25.

A tablet stopper 10 locates the portion of the consumable tablet 40 just below the water level 180, advantageously controlling the rate that the consumable tablet 40 dissolves. This controlled release of disinfectant from the consumable tablet 40 into the water ensures that a continuous disinfectant presence is in the water. A water inlet hole or aperture 120 is optionally provided in the tablet stopper 10 and forms a passage for water to reach the consumable tablet 40.

In an alternative embodiment a very tiny hole 120 or holes in the stopper 10 can allow or gel disinfectant to drain slowly into the water in the U-bend moulding 20.

Toothed rubber seal 30 is water tight between the U-bend moulding 20 and the reusable tablet holder 80. Advantageously in use this prevents spillage of water from the drain when the water level rises due to flow into the drain.

An O-ring 50 provides a further seal between the moulding 20 and holder 80. Both the toothed rubber seal 30 and the O-ring 50 locate the reusable tablet holder 80 when it is screwed into its operating position.

The consumable tablet 40 is attached to the rubber spur 60 of the reusable tablet holder 80. The consumable tablet 40 is held in place by the rubber spur 60 and secured beneath by the toothed rubber seal 30. These rubber components 30 and 60 not only seal, but also stabilise the consumable tablet 40. Above the rubber spur 60 is the tablet spring 70, which is in turn attached to the indicator 100 above it. The end of life indicator 100 is visible to the user of the device through a sealed transparent dome 90. A sliding seal between rubber spur 60 and the cylinder wall of the reusable tablet holder 80 prevents water from reaching the end of life indicator 100.

The reusable tablet holder 80 is screwed onto the branch of the drain trap U-bend moulding. As the tablet is screwed down, the tablet spring 70 compresses until the consumable tablet 40 is stopped by the toothed rubber seal 30. On full tightening, the toothed rubber seal (3) deforms and seal around the consumable tablet 40. Advantageously toothed edges offer better sealing properties than flat edges.

In use the end of life indicator 100 is held raised in the indicating position by the tablet spring 70 when there is a consumable tablet 40 in place. In the indicating position the end of life indicator 100 shows a user that the consumable tablet 100 has not yet been fully consumed. When the end of life indicator 100 is fully consumed, then the end of life indicator 100. When the consumable tablet 40 is fully dissolved, the tablet spring 70 relaxes and the end of life indicator 100 falls under gravity enabling the user to clearly see when the consumable tablet 40 needs changing. Advantageously the user can see when the consumable tablet needs to be replaced without having to look at the unsightly water and contaminants trapped in the U-bend moulding 20.

The comprised with the end of life indicator 100 is an alarm. The alarm may include a light, sound, or radio frequency communicator. The indicator with the radio frequency communicator transmits to a central maintenance system 300 information as to the identification and location of the self disinfecting drain trap. Thus for a system of self disinfecting drain traps, for example 300A, 300B, and 300C, the maintenance system 300 gives people responsible information regarding how many replacement tablets are needed and for which drain traps.

In use the re-usable tablet holder 80, containing the consumable tablet 80, is inserted into the branch 25 of the trap U-bend moulding 20 and made water-tight by the O-ring 50 which deforms to seal the branch 25. The end-of-life indicator 100 is raised to show the consumable tablet 40 has been correctly installed. Advantageously the sealed transparent silicon dome 90 also allows the user to manually depress the end of life indicator 100 in case of a blockage.

The water level 180 is below the height of the outlet 300 of the branch 25 of the U-bend moulding 20 when the water rests stopped in the U-bend. Advantageously, even if the rubber seals (30, 50, 60, and 90) are not water tight, there is no leakage of the water trapped in the U-bend onto the floor.

When the user removes the reusable tablet holder 80, the water level 180 remains below the outlet 300 of the branch 25 of the U-bend moulding 20 for the re-usable tablet holder 80. The water 200 remains in the trap U-bend moulding 20 so there's no risk of it flowing out through the outlet 300. Advantageously the consumable tablet 40 can be replaced and there is no needed for a bucket or mop to capture the water in the drain.

A valve 400 in the branch 25 closes itself unless it is urged open. The valve may be opened by the tablet holder 80 or the tablet 40 by poking it through the valve. With the valve 400 closed liquid cannot flow out of the branch 25.

The invention has been described by way of preferred examples only and it will be appreciated that variation to the aforementioned embodiments may be made without departing from the scope of protection as defined in the claims.

The invention claimed is:

1. A self-disinfecting drain trap, comprising:
    a drain trap U-bend moulding with a branch for receiving a disinfectant tablet, the branch having a closure cap that is located above the surface of liquid present in the U-bend;
    whereby in use a portion of the disinfectant tablet is maintained in continuous contact with the liquid in the U-bend by a resiliently deformable member located in the branch thereby ensuring a continuous disinfectant presence in the liquid.

2. A self-disinfecting drain trap according to claim 1, wherein:
    the resiliently deformable member includes a spring.

3. A self-disinfecting drain trap according to claim 2, wherein:
    the spring is arranged to locate the disinfectant tablet between an upper indicator and a lower retention means.

4. A self-disinfecting drain trap according to claim 1, wherein:
    the branch is dimensioned and arranged to receive a tablet holder.

5. A self-disinfecting drain trap according to claim 4, wherein:
    the tablet holder is sealed in the branch of the drain trap U bend moulding.

6. A self-disinfecting drain trap according to claim 4, wherein:
    the disinfectant tablet is retained within a reusable tablet holder that is dimensioned and arranged to fit in the branch in a sealable manner.

7. A self-disinfecting drain trap according to claim 6 wherein:
    the reusable tablet holder has a threaded outer sleeve adapted to engage with a thread disposed on an inner surface of the branch.

8. A self-disinfecting drain trap according to claim 6, further comprising:
    a rubber seal between a cap of the reusable tablet holder and the branch.

9. A self-disinfecting drain trap according to claim 1, further comprising:
an indicator to alert a user to replace said disinfectant tablet.

10. A self-disinfecting drain trap according to claim 9, wherein:
the indicator includes a spring loaded plunger adapted to trigger when predetermined amount of the disinfectant tablet has dissolved.

11. A self-disinfecting drain trap according to claim 9, wherein the indicator comprises:
a switch which closes a circuit and triggers an alarm.

12. A self-disinfecting drain trap according to claim 11, wherein:
the alarm is relayed to a remote user via a wireless communication system.

13. A self-disinfecting drain trap according to claim 1, further comprising:
a valve in the branch to close passage through said branch upon removal of the reusable tablet holder.

14. A self-disinfecting drain trap according to claim 1, further comprising:
a transmitter to broadcast a broadcast signal from said self-disinfecting drain trap when said tablet holder needs refilling.

15. A self-disinfecting drain trap, comprising:

a drain trap U-bend moulding with a branch for receiving a disinfectant tablet, the branch having a closure cap that is located above the surface of liquid present in the U-bend; and an indicator to alert a user to replace the disinfectant tablet, the indicator including a spring loaded plunger adapted to trigger when predetermined amount of the disinfectant tablet has dissolved;

whereby in use a portion of the disinfectant tablet is maintained in contact with the liquid in the U-bend by a resiliently deformable member located in the branch.

* * * * *